(12) United States Patent
Raines et al.

(10) Patent No.: US 8,936,273 B1
(45) Date of Patent: Jan. 20, 2015

(54) WELD SEAM STRESS RELIEF FOR ACTIVE BOLSTER WITH PLASTIC-MOLDED BLADDER

(71) Applicant: Ford Global Technologies, LLC, Dearborn, MI (US)

(72) Inventors: Stacey H. Raines, Ypsilanti, MI (US); Nicholas A. Mazzocchi, Ann Arbor, MI (US); Sean B. West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 13/975,976

(22) Filed: Aug. 26, 2013

(51) Int. Cl.
  *B60R 21/045* (2006.01)
  *B60R 21/04* (2006.01)

(52) U.S. Cl.
  CPC ......... *B60R 21/04* (2013.01); *B60R 2021/0407* (2013.01)
  USPC .......................... 280/753; 280/752; 280/730.1

(58) Field of Classification Search
  CPC .................. B60R 21/045; B60R 21/04; B60R 2021/0051; B60R 2021/0273; B60R 2021/23519; B60R 2021/0407; B60R 2021/21525
  USPC .................. 280/753, 752; 296/187.05, 187.06
  See application file for complete search history.

(56) References Cited

U.S. PATENT DOCUMENTS

| | | | |
|---|---|---|---|
| 5,613,706 A | 3/1997 | Parker et al. | |
| 5,932,832 A | 8/1999 | Hansen et al. | |
| 6,032,978 A | 3/2000 | Spencer et al. | |
| 6,213,497 B1 | 4/2001 | Spencer et al. | |
| 6,265,097 B1 | 7/2001 | Konno et al. | |
| 6,758,493 B2 | 7/2004 | Conlee et al. | |
| 6,935,655 B2 | 8/2005 | Longhurst et al. | |
| 7,234,726 B2 | 6/2007 | Trevino et al. | |
| 7,556,285 B1 | 7/2009 | Hayashi | |
| 7,631,890 B1 | 12/2009 | Kalisz et al. | |
| 8,448,980 B1 * | 5/2013 | Kalisz | 280/730.1 |
| 8,474,868 B2 | 7/2013 | Kalisz et al. | |
| 8,544,878 B1 * | 10/2013 | Kalisz et al. | 280/730.1 |
| 8,544,879 B1 * | 10/2013 | Mazzocchi et al. | 280/730.1 |
| 8,720,948 B2 * | 5/2014 | Raines et al. | 280/752 |

(Continued)

OTHER PUBLICATIONS

Raj S. Roychoudjury, et al., Blow-Molded Plastic Active Knee Bolsters, SAE Technical Paper Series, 2004-1-0844, Mar. 8-11, 2004.

(Continued)

*Primary Examiner* — Ruth Ilan
(74) *Attorney, Agent, or Firm* — Vichit Chea; MacMillan, Sobanski & Todd, LLC

(57) ABSTRACT

An active bolster at an interior trim surface of an automotive vehicle has a plastic-molded outer trim panel and a plastic-molded expandable bladder member. The bladder member has a central attachment section configured to attach to a support structure of the vehicle, a welding flange welded to the trim panel, and a baffle section between the attachment section and the welding flange. An inflator couples an inflation gas into a space between the trim panel and bladder member to expand the bladder member in response to a crash event of the vehicle. The welding flange has a generally-rectangular profile with a pair of long edges and a pair of short edges. The baffle section includes circumferential pleats providing an expansion length of the bladder member that is greater at the long edges than at the short edges to reduce stress on the weld along its weakest point.

10 Claims, 6 Drawing Sheets

(56) References Cited

U.S. PATENT DOCUMENTS

| | | |
|---|---|---|
| 2002/0008368 A1 | 1/2002 | Kurimoto |
| 2002/0125691 A1* | 9/2002 | Conlee et al. ............. 280/730.1 |
| 2003/0047915 A1 | 3/2003 | Sun et al. |
| 2004/0212182 A1 | 10/2004 | Canterberry |
| 2005/0052002 A1 | 3/2005 | Hayashi et al. |
| 2006/0255569 A1 | 11/2006 | Weissert et al. |
| 2008/0100038 A1 | 5/2008 | Finch et al. |
| 2011/0272926 A1 | 11/2011 | Roychoudhury et al. |
| 2011/0316300 A1 | 12/2011 | Kalisz |
| 2012/0068441 A1 | 3/2012 | Kalisz |
| 2012/0112439 A1 | 5/2012 | Roychoudjury |
| 2012/0248741 A1 | 10/2012 | Kalisz |

OTHER PUBLICATIONS

Bijoy K. Saraf, et al., Active Bolster for Side Impact Protection, SAE Technical Paper Series, 2008-01-0191, Apr. 14-17, 2008.

* cited by examiner

WELD SEAM STRESS RELIEF FOR ACTIVE BOLSTER WITH PLASTIC-MOLDED BLADDER

CROSS REFERENCE TO RELATED APPLICATIONS

Not Applicable. STATEMENT REGARDING FEDERALLY SPONSORED RESEARCH
Not Applicable.

BACKGROUND OF THE INVENTION

The present invention relates in general to active bolsters for occupant crash protection in automotive vehicles, and, more specifically, to reducing weld stress during deployment of an inflatable bladder in an active bolster.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall may have a pleated (i.e., accordion-like) region that straightens out during inflation. The walls are initially spaced apart by a small amount when in their pre-deployment, non-inflated condition. This allows ingress of the inflation gas in a manner that can achieve an even inflation across the panel.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation.

A known method of sealing the bladder walls is by hot welding, which involves heating of the matching surfaces and then compressing them together. Examples include hot plate welding, IR welding, and laser welding. A generally planar welding flange may be provided around the outer perimeter of the inner wall which is received by a generally planar surface of the outer wall. The outer wall surface may also include upstanding sealing ribs that increase the weld strength by penetrating and fusing with the welding flange during the hot welding process in which the welding flange and sealing ribs are heated and then compressed. Despite the penetration of the sealing ribs, weld separation has continued to be a potential failure mode for active bolsters.

Various stresses during inflation can contribute to the possibility of weld failure. Due to the elasticity required for making the pleated bladder wall inflatable, a significant peel stress is applied to the weld seam during expansion. Another source of stress is the shock wave caused by the explosive initiation of gas flow from the inflator. Twisting and uneven bulging of the overall bladder structure during inflation can create stress or concentrate existing stresses at certain weld locations.

SUMMARY OF THE INVENTION

In one aspect of the invention, an active bolster is provided for mounting at an interior trim surface of an automotive vehicle comprising a plastic-molded outer trim panel and a plastic-molded expandable bladder member. The bladder member has a central attachment section configured to attach to a support structure of the vehicle, a welding flange welded to the trim panel, and a baffle section between the attachment section and the welding flange. An inflator couples an inflation gas into a space between the trim panel and bladder member to expand the bladder member in response to a crash event of the vehicle. The welding flange has a generally-rectangular profile with a pair of long edges and a pair of short edges. The baffle section includes circumferential pleats providing an expansion length of the bladder member that is greater at the long edges than at the short edges.

DETAILED DESCRIPTION OF PREFERRED EMBODIMENTS

Figure 1:
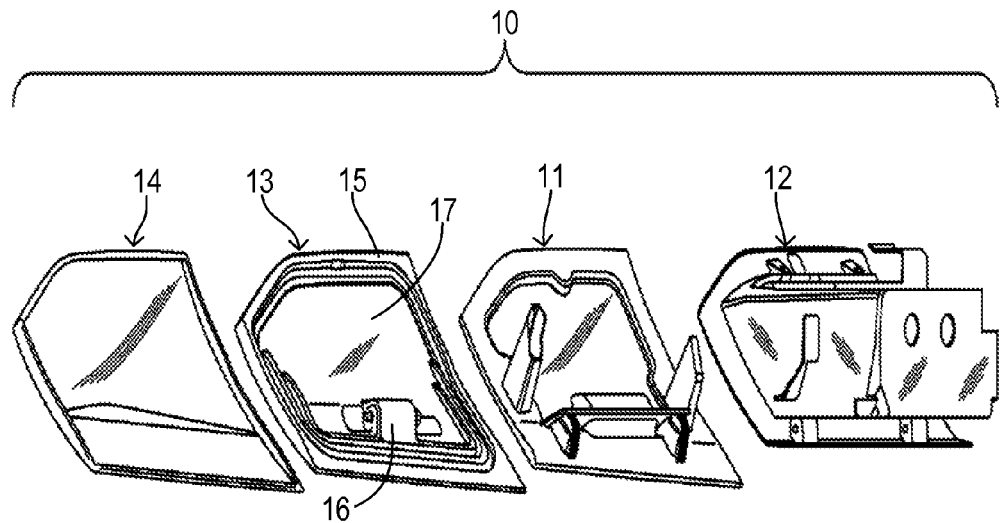
FIG. 1 is an outward-looking, exploded perspective view of a prior art active knee bolster glove box door system of a type to which the present invention can be applied.

Referring now to FIG. 1, a prior art active knee bolster system 10 has a base panel component 11 which forms the support structure or foundation for the bolster. Base 11 may be part of a glove box door which is attached to the vehicle by hinging from a storage cavity or glove box 12 as shown in FIG. 1. Alternatively, the active bolster can be mounted to another support structure such as an instrument panel support below a steering column, for example. Such locations interface to the knees of an individual riding in a corresponding seating position within a vehicle.

Base 11 acts as a reaction surface for supporting an inflatable bladder formed by an inner (bladder) wall 13 and an outer (trim panel) wall 14 that are joined around their periphery 15. Walls 13 and 14 are preferably comprised of molded plastics (such as thermoplastic polyolefin (TPO)) and are joined by plastic welding, such as hot plate welding, to form a peripheral seal around a central region 17 for forming a bladder. An inflation gas source (i.e., inflator) 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
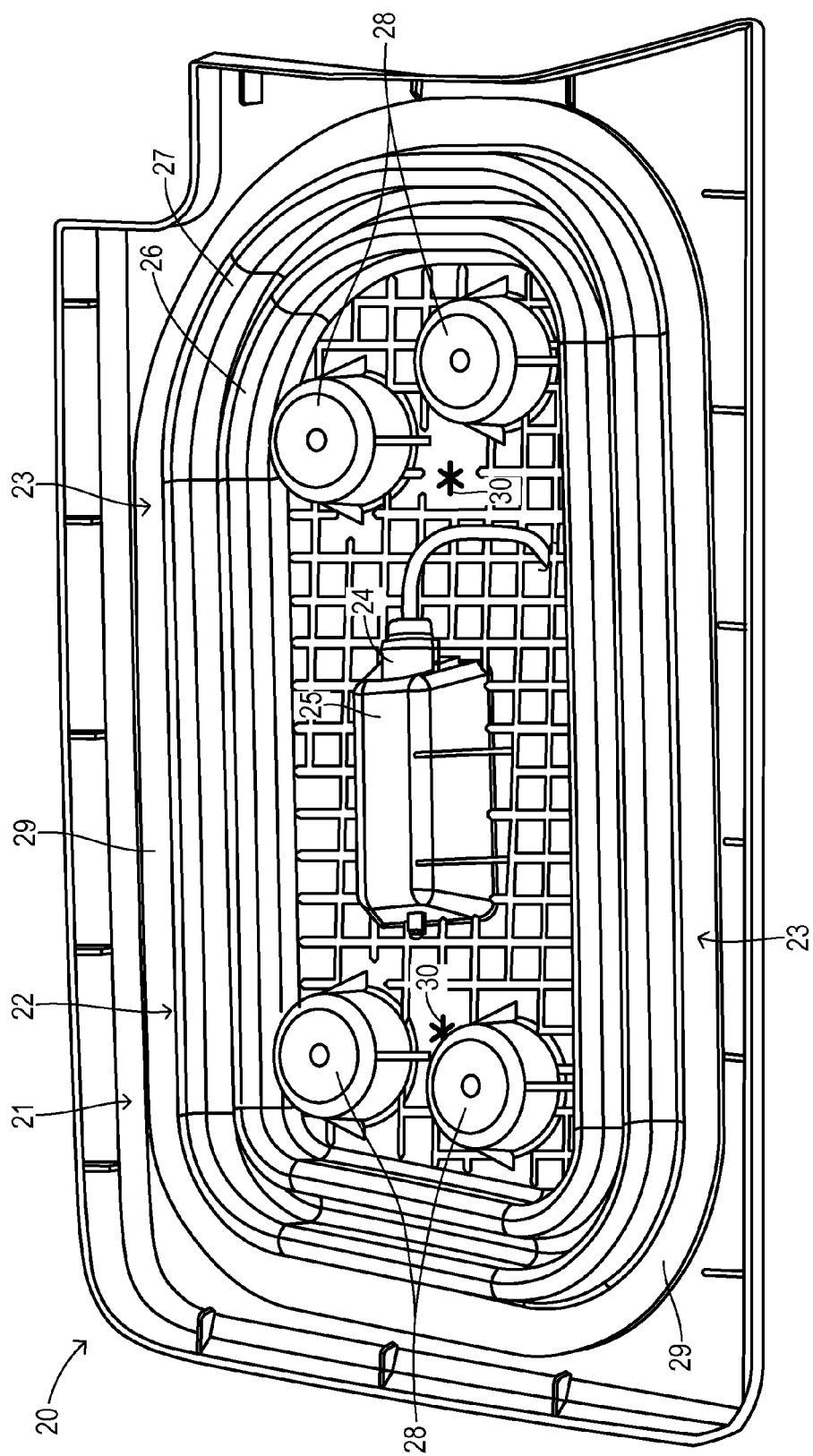
FIG. 2 is a rear perspective view of an outer trim panel and bladder wall assembly of a prior art active bolster.

FIG. 2 is a rear view of an inflatable bladder 20. A plastic-molded outer trim panel wall 21 overlies a plastic-molded, expandable inner bladder wall 22. Walls 21 and 22 are joined around a closed perimeter region 23 to form an inflatable bladder having an open central volume between walls 21 and 22 to receive an inflation gas during a crash event from an inflator 24 mounted in a recess 25 of bladder wall 22. Bladder wall 22 includes a plurality of pleats, such as 26 and 27, to accommodate the expansion of bladder wall 22 during inflation. A plurality of bosses 28 are used to mount bladder wall 22 to a support structure acting as a reaction surface. A welding flange 29 extends circumferentially around bladder wall 22. Vent holes 30 comprised of an asterisk-shaped pattern cut through bladder wall 22 may be included for venting the central volume prior to and during deployment.

Figure 3:
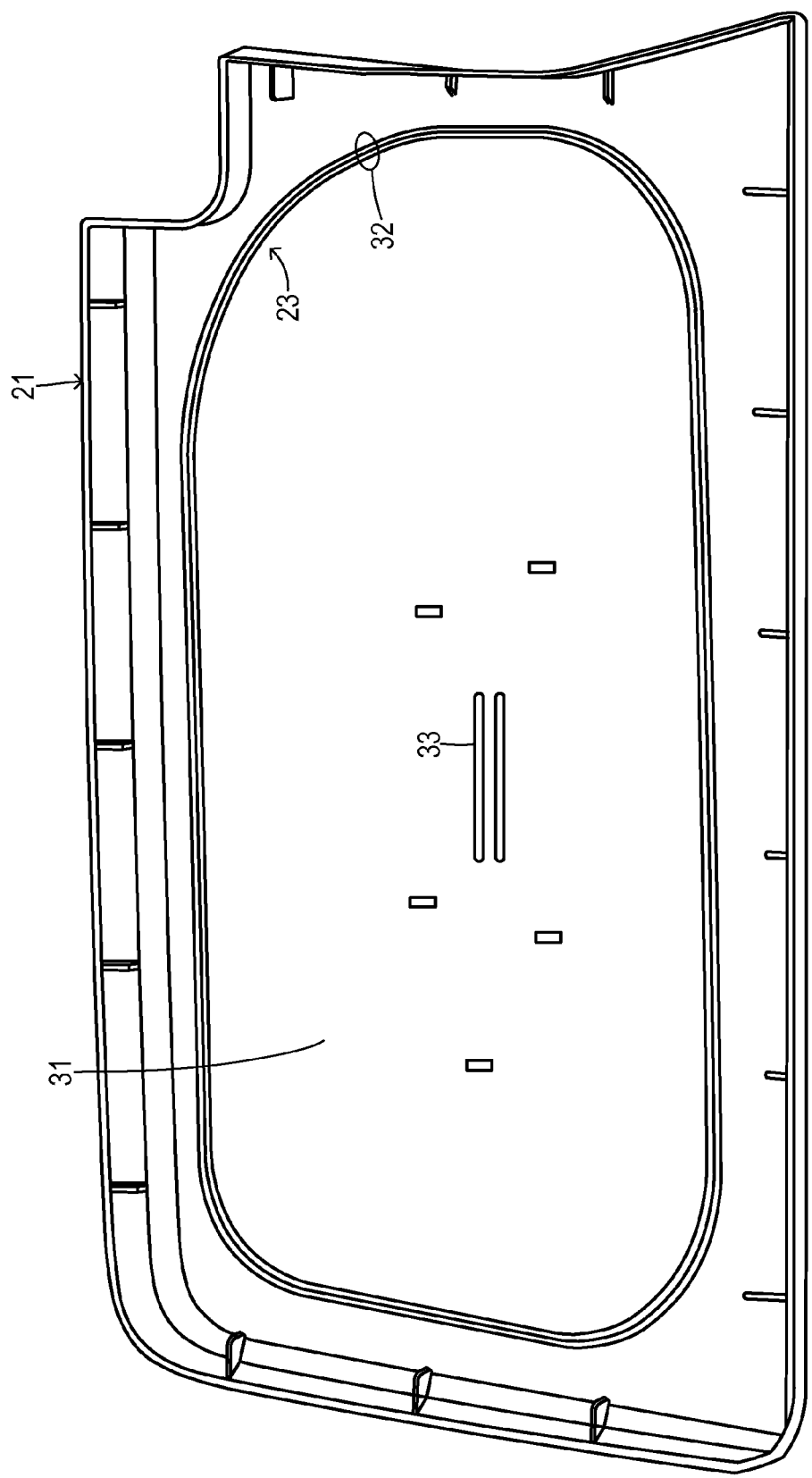
FIG. 3 is a perspective view of the prior art outer trim panel of FIG. 2 with the bladder wall removed.

FIG. 3 shows outer wall 21 with the inner bladder wall removed revealing a bladder surface 31 that faces the inner wall when assembled. A plurality of upstanding ribs 32 follow closed perimeter region 23 and are joined with flange 29 of inner bladder wall 22 (FIG. 2) by hot welding to create a hermetic seal for the inflatable bladder. Ribs 33 are provided for supporting the inflator.

Figure 4:
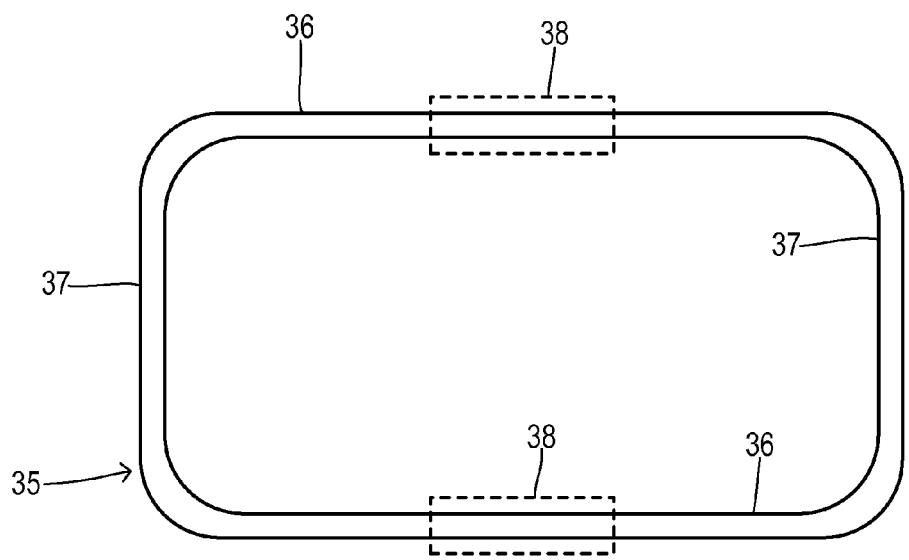
FIG. 4 is a plan view of a welding flange showing regions subject to a higher stress.

FIG. 4 illustrates a footprint 35 for a typical weld between a bladder member and an outer trim panel, such that a weld seam follows a generally-rectangular profile with a pair of long edges 36 and a pair of short edges 37. The longer, horizontal dimension of the generally-rectangular profile corresponds to the side-to-side distance necessary to accommodate both knees of a seated vehicle occupant. When the pleated material of a bladder elongates during inflation, a highest peel stress tends to occur at central portions 38 of long edges 36. Due to the higher stress, prior art bolsters had an increased potential for weld failure along central portions 38.

Figure 5:
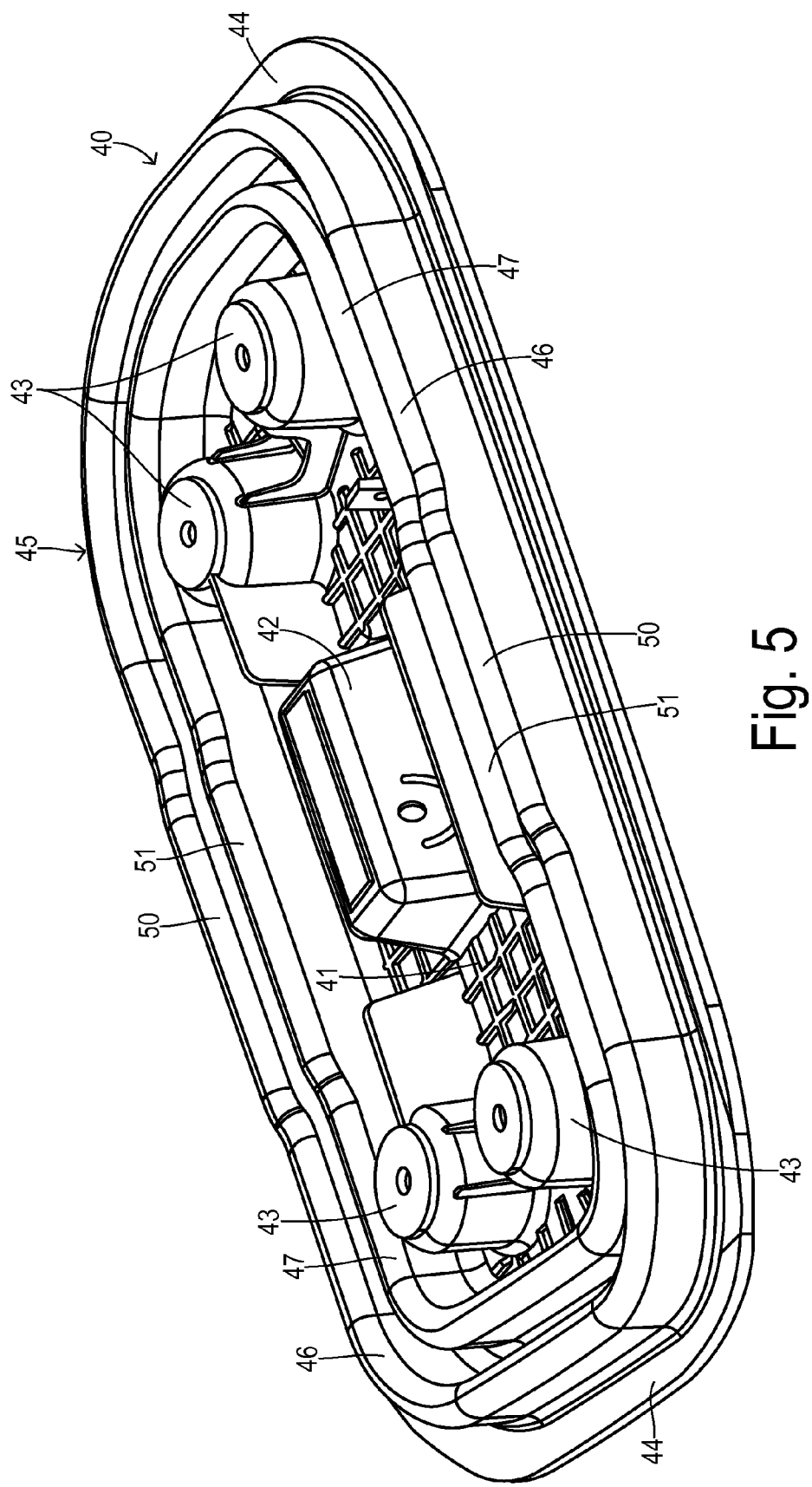
FIG. 5 is a rear perspective view of a bladder member of the present invention having pleats with an increased height along a longest edge.

A bladder member 40 shown in FIG. 5 is configured to reduce the stress otherwise being applied at the central portions of the longest sides. Bladder member 40 has a central attachment section 41 having an inflator recess 42 and a plurality of mounting bosses 43. Bosses 43 and inflator body 42 may be attached (e.g., by welding) to a vehicle support structure such as a glove box door, instrument panel support, door frame, or others.

Bladder member 40 has an outer welding flange 44 for welding to an outer trim panel (not shown) to create an inflatable bladder for an active bolster. Bladder member 40 further includes a baffle section 45 between attachment section 41 and welding flange 44.

Baffle section 45 needs to have a substantially uniform thickness throughout in order to create a steady, predictable deployment trajectory and shape. Along the longest edges however, a peeling force transferred to the weld seam has the greatest magnitude as a result of the longest uninterrupted expansion interface. The present invention counteracts the tendency to create a higher stress level by providing an expansion length across the pleated baffle section 45 to thereby introduce a relative slackness at the central portions of the long edges. In the embodiment of FIG. 5, pleats 46 and 47 are provided with an increased height at central portions 50 and 51. As a result of the increased height, the unfolded length of the pleats (perpendicular to the welding flange) is greater at the long edges then at the short edges.

Figure 6:
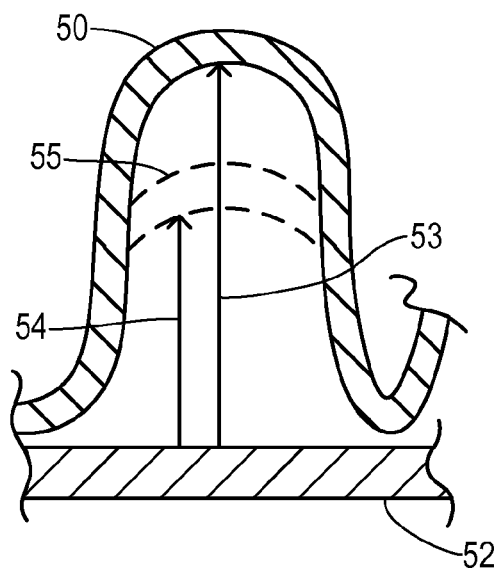
FIG. 6 is a cross-sectional view of a height profile of a pleat.

FIG. 6 shows a height profile for a central portion 50 as measured from a front trim panel 52. A pleat at central portion 50 has a height shown at 53 which is greater than a corresponding height 54 of a non-central long-edge portion of the pleats 55 (i.e., along the short edges). Due to its greater height 53, central portion 50 has an unfolded length greater than the other portions of the same pleat disposed at a different location around the perimeter. In a preferred embodiment, all the pleats acting together around the full perimeter of bladder member 40 provide a height profile extending away from the trim panel that is a) substantially uniform along the short edges and along end portions of the long edges that are contiguous with the short edges, and b) taller along central portions 50 and 51 then at the end portions of the long edges. Since more expansion length is available at the central portions of the long edges, a greater amount of built-in slack reduces the force pulling on the weld seam at positions that otherwise would have experienced a higher peeling force. Instead of an increased height, the increase in expansion length along the long edges can be obtained using other shapes for the pleats and/or raising the height of the intermediate folds between pleats.

Figure 7:
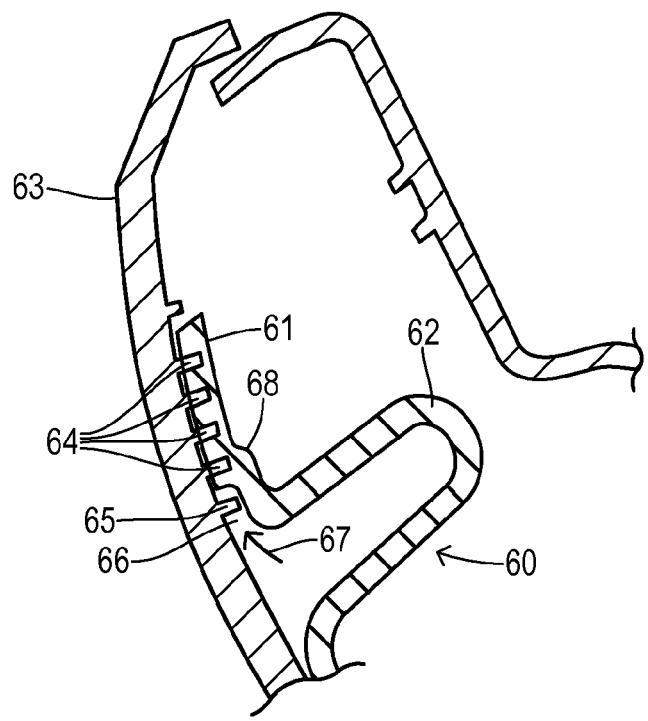
FIG. 7 is a cross section of a portion of an active bolster showing a weld seam protected by a blocking rib formed on the outer trim panel.

To address the potential effects of the initial inflation gas shock wave during the initial stages of deployment, the present invention introduces a solid wall extending from the trim panel as a blocking rib between the expansion chamber and the weld seam. As shown in FIG. 7, a bladder member 60 has a welding flange 61 and a first (radially outermost) pleat 62. A trim panel 63 has a plurality of welding ribs 64 that penetrate and fuse with the heated plastic material of welding flange 61. A circumferential blocking rib 65 is disposed radially inward from welding ribs 64 and likewise extends inwardly toward bladder member 62. A hump 68 is preferably provided in bladder member 60 between welding flange 61 and pleat 62 to create a pocket 66 for accommodating blocking rib 65, whereby blocking rib 65 bears against bladder member 60 at a position radially outward of the pleats in order to block an inflation gas shock wave 67 from reaching the hot weld between flange 61 and welding ribs 64. During a welding operation when an active bolster is assembled, welding flange 61 is heated, welding ribs 64 may or may not be heated, and blocking rib 65 is not heated. Blocking rib 65 does not fuse with bladder member 60 (although the material of hump 68 may flow over blocking rib 65 filling or partially filling pocket 66). In commonly owned U.S. application Ser. No. 13/627,181, a blocking rib is shown extending from the bladder member. The blocking rib integrated on the bladder member pulls away from the seam during expansion so that the protection afforded the weld seam is lost during unfolding. Blocking rib 65 does not pull away during inflation, so that weld protection continues during the entire time of deployment.

Figure 8:
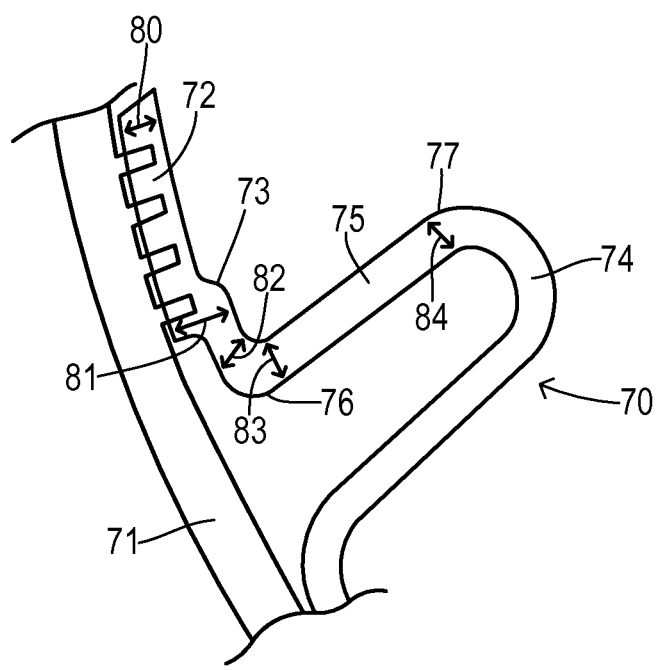
FIG. 8 is a cross-sectional view of a weld seam and an initial pleat with a tapered thickness to reduce a peel stress.

FIG. 8 shows a further embodiment of the invention configured to slow down the rate of elongation in the pleated section along its outer most edge in order to reduce the peel force applied to the weld seam. Thus, a bladder member 70 is welded to a front trim panel 71 at a welding flange 72. A hump 73 may or may not be present between an outer most pleat fold 74 and welding flange 72 (e.g., depending upon whether a block rib (not shown) is used). Pleat 74 has an initial (radially-outermost) pleat wall 75 with a tapered thickness greatest at its end 76 closest to welding flange 72. In one preferred embodiment, welding flange 72 has a thickness 80 of about 3.5 mm. Hump 73 preferably has a thickness 81 of about 3.8 mm. A thickness of about 3.8 mm may continue toward the beginning of pleat 74 for the thicknesses at 82 and 83. Thus, initial pleat wall 75 has a thickness of about 3.8 mm at its lower end 76. By tapering the thickness along pleat wall 75 at increasing distance away from lower end 76, a thickness 84 of about 2.5 mm is preferably obtained at an upper end 77. Preferably, the remainder of the pleats in the baffle section maintain a substantially constant thickness of about 2.5 mm in order to provide a smooth, even deployment. The tapering of the thickness reduces the thickness along initial pleat wall 75 by about 20% to about 40%. More preferably, the reduction in thickness falls in a range of about 30% to 35% to achieve an optimum reduction in the unfolding speed across initial pleat wall 75 while maintaining excellent overall deployment characteristics.

What is claimed is:

1. An active bolster for mounting at an interior trim surface of an automotive vehicle, comprising:
   a plastic-molded outer trim panel;
   a plastic-molded expandable bladder member having a central attachment section configured to attach to a support structure of the vehicle, a welding flange welded to the trim panel, and a baffle section between the attachment section and the welding flange; and
   an inflator for coupling an inflation gas into a space between the trim panel and bladder member to expand the bladder member in response to a crash event of the vehicle;
   wherein the welding flange has a generally-rectangular profile with a pair of long edges and a pair of short edges; and
   wherein the baffle section includes circumferential pleats providing an expansion length of the bladder member that is greater at the long edges than at the short edges.

2. The active bolster of claim 1 wherein the pleats have a height profile extending away from the trim panel that is a) substantially uniform along the short edges and along end portions of the long edges that are contiguous with the short edges, and b) taller along central portions of the long edges than at the end portions of the long edges.

3. The active bolster of claim 2 wherein the increase of the expansion length at the taller central portions relative to the end portions is in a range of about 10% to about 50%.

4. The active bolster of claim 1 wherein the trim panel has a plurality of circumferential welding ribs hot welded to the welding flange, and wherein the trim panel includes a circumferential blocking rib disposed radially inward of the welding ribs bearing against the bladder member radially outward of the pleats for blocking the inflation gas from reaching the hot weld between the welding flange and the welding ribs.

5. The active bolster of claim 4 wherein the bladder member has a raised circumferential hump between the welding flange and the pleats forming a pocket for receiving the blocking rib.

6. The active bolster of claim 1 wherein the baffle section has an initial pleat wall proximate to the welding flange, wherein the initial pleat wall has a tapered thickness greatest at an end closest to the welding flange.

7. The active bolster of claim 6 wherein the tapering of the initial pleat wall thickness results in a thickness reduction in a range of about 20% to about 40%, and wherein a remainder of the pleats has a substantially constant thickness equal to the reduced thickness of the initial pleat wall.

8. The active bolster of claim 7 wherein the range is about 30% to about 35%.

9. An inflatable bladder for an active bolster, comprising:
   a substantially-planar trim wall; and
   a bladder wall with a plurality of pleats and a welding flange following an enclosed perimeter of the bladder wall that is welded to the trim wall;
   wherein the pleats have a greatest height from the trim wall at a central portion of a longest edge of the bladder wall thereby applying lower stress at an adjacent portion of the weld.

10. The bladder of claim 9 wherein the trim wall includes a raised blocking rib extending into contact with the bladder wall between the welding flange and the pleats to restrict flow of an inflation gas delivered between the trim wall and the bladder wall.

* * * * *